UNITED STATES PATENT OFFICE.

EDWARD MILNER, OF SPRINGFIELD, WARRINGTON, ENGLAND.

IMPROVEMENT IN THE MANUFACTURE OF WHITE LEAD FOR PIGMENTS.

Specification forming part of Letters Patent No. 140,721, dated July 8, 1873; application filed June 18, 1873.

*To all whom it may concern:*

Be it known that I, EDWARD MILNER, of Springfield, Warrington, in the county of Lancaster, England, salt manufacturer, have invented Improvements in the Method of Producing White Pigments from Lead, of which the following is a specification:

My invention relates to an improved method of manufacturing white lead (carbonate of lead) from litharge, and is a further improvement based on the process described in the Letters Patent of the United States granted to John Gallemore Dale and Edward Milner, 12th day of January, 1869, numbered 85,796, and the same as an English patent for these improvements applied for and granted to me the 22d day of June, 1872.

First, I take the oxide of lead (commonly known as litharge) in a finely-ground state, and mix it with a solution of the chlorides of sodium, potassium, or ammonium, and put the mixture into a state of constant agitation for a few hours. The result is a liquid containing in suspension an exceedingly white flocculent compound, consisting of hydrated oxide and chloride of lead, and when common salt is used a quantity of caustic soda in solution. Secondly, into the mixture so formed and in the same vessel I then pass a current of carbonic acid and violently agitate it. This I continue until the solution no longer gives an alkaline reaction, and the product is a nearly pure carbonate of lead of great body and opacity, which only needs washing to free it from salts, and is then ready to be dried and used for all the purposes to which white lead is applied. I find that thirty to forty parts of water to ten parts of litharge and one of common salt answer well, but I do not consider those precise proportions essential. Thirdly, or, instead of using the same vessel in which the first part of the process is carried out for the subsequent operation, I run the mixture into a vessel having an air-tight cover and fitted with an agitator, and introduce the carbonic-acid gas into the mixture by means of a pump or other apparatus, the gas being introduced into the mixture at the bottom or some low point.

By this means I obtain a gradually-increasing pressure, and consequently a more rapid and perfect absorption of the gas.

I claim as my invention—

The manufacture of white lead or carbonate of lead by treating a mixture composed of litharge and chloride of ammonium or of potassium, or of sodium, with carbonic-acid gas, either under pressure or in an open vessel, substantially as described.

EDWARD MILNER.

Witnesses:
    GEO. FELL,
        *Springfield, Warrington.*
    WALTER MILNER,
        *Warrington.*